L. A. BEARDSLEE.
Machine for Testing the Strength of Materials

No. 161,653. Patented April 6, 1875.

Witnesses:
Shell H. Moxon
Jas. Stevenson

Inventor:
Lester A. Beardslee
by A. N. Evans & Co.
Attys.

UNITED STATES PATENT OFFICE.

LESTER A. BEARDSLEE, OF WASHINGTON, DISTRICT OF COLUMBIA.

IMPROVEMENT IN MACHINES FOR TESTING THE STRENGTH OF MATERIALS.

Specification forming part of Letters Patent No. 161,653, dated April 6, 1875; application filed January 23, 1875.

*To all whom it may concern:*

Be it known that I, LESTER A. BEARDSLEE, of Washington, District of Columbia, have invented certain new and useful Improvements in Dynamometers; and I hereby declare the following to be a full, clear, and exact description thereof, reference being had to the accompanying drawings, making a part of this specification, in which—

Figure 1:
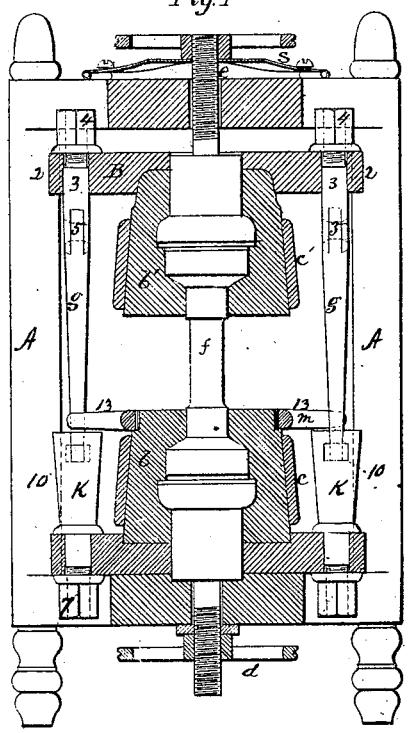
Figure 2:
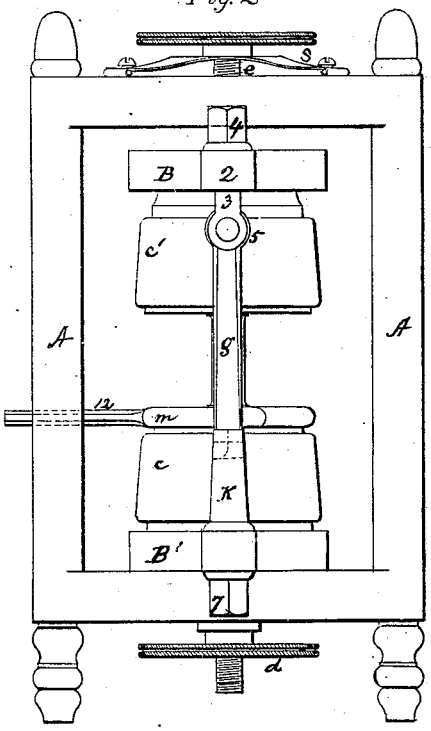
Figure 3:
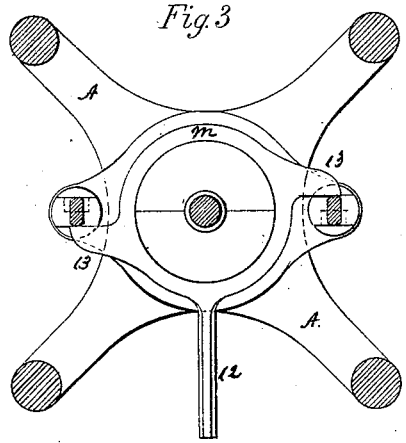
Figure 4:
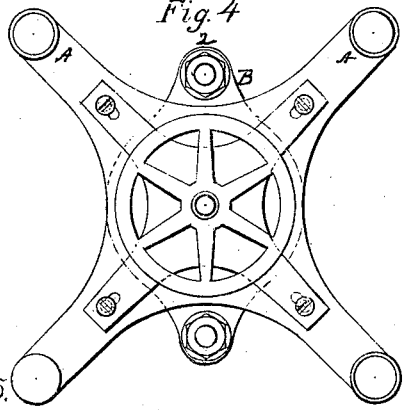

Figure 1 is a vertical section. Fig. 2 is a side view. Fig. 3 is a horizontal section. Fig. 4 is a top view, and Fig. 5 a detail.

The object of my invention is to test the tensile strength of metals under a sudden strain; and it consists in suddenly transferring the strain of the ordinary dynamometer from a receiver to the metal to be tested.

To enable others skilled in the art to make and use my invention, I will proceed to describe the exact manner in which I have carried it out.

In the drawings, A A represent the ordinary frame-work of a dynamometer or other machine for testing the tensile strength and other properties of metals.

The specimen to be tested, $f$, is turned to such proportions as will fit between the clamps, and rests upon a standard. The clamps $b$ and $b'$, which are provided with recesses, to which the heads of the standards and heads of the test-pieces have been made to conform, so as to securely hold them, are of the form of truncated cones, divided evenly on a vertical central line. These are placed snugly around the specimen and standards, the compressing-rings $c$ $c'$ are slipped down, and, by means of the foot-screw $d$, the clamps, bands, and specimen are tautened in the machine with a slight strain.

In the said drawings, the screw $e$ and spring $s$ represent the power by which the specimen is to be strained. In some machines this is done by cog-gearing and screw-power, in others by dead-weights and levers, the strain being applied by either turning a crank in the former case, or by adding weights in the latter. A gradually-increasing strain is brought to bear upon the specimen $f$, which is eventually torn asunder. The amount of strain at any moment is measured upon a scale-beam with proper weights.

Figure 5:
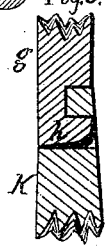

Over the top of the clamp $b'$ I fit a steel plate, B, having ears 2 2. This plate moves with the clamp $b'$, and is pierced in the ears to receive two heavy bolts, 3 3, which are held by heavy nuts 4 4. The lower ends of these bolts are bifurcated, as seen at 5, and hinged into them by heavy bolts are strong steel receivers or legs $g$ $g$, having their lower ends provided with projecting feet $h$ $h$, shaped about as shown in Fig. 5. Lying beneath the stationary or lower clamp $b$ is a heavy plate, B', corresponding in shape to the plate B. Through its ears are heavy bolts $k$ $k$, secured beneath by nuts 7 7, and having their upper ends enlarged, as shown. In these enlarged ends are recesses 10 10, made to conform in shape, and at the angle of slightest friction, to the projecting feet $h$ $h$. Around the upper edge of the clamp $b$ is a loose ring, $m$, having a lever-handle, 12, and two projections, 13 13, being cam-shaped on one edge and straight upon the other.

The test-piece $f$ being introduced and clamped in the machine, the feet $h$ $h$ are introduced into their respective recesses 10 10, and the legs or receivers adjusted in length by the nuts 4 4. The power is then applied until any given strain is reached upon the legs or receivers $g$ $g$. Thereupon the arm or lever 12 is moved around until the projections 13 13 bear against the receivers $g$ $g$, and force them from the recesses 10 10, and suddenly throw upon the test-piece a calculable strain, which is sufficient to break or stretch the metal tested, according to its degree of ductility.

Sometimes I find it advantageous to have the recesses 10 10 and feet $h$ $h$ work radially to the clamps B B', when I will use the cam faces or edges of the projections 13 13 to force the feet $h$ $h$ outward.

Having thus described my invention, what I claim as new, and desire to secure by Letters Patent, is—

1. The method of testing metals by suddenly transferring a given strain from any means of restraint to the specimen to be tested, for the purpose set forth.

2. The plates B B′, in combination with the bolts 3 3, legs $g\ g$, having feet $h\ h$, and bolts $k\ k$, having recesses 10 10, substantially as described.

3. The plates B B′, bolts 3 3, legs $g\ g$, having feet $h\ h$, bolts $k\ k$, having recesses 10 10, in combination with the clamps $b\ b'$, as and for the purpose set forth.

4. The ring $m$, constructed with the lever 12 and projections 13 and 13, in combination with the clamp B and legs $g\ g$, substantially as described, and for the purpose set forth.

LESTER A. BEARDSLEE.

Witnesses:
 WILL H. MOXON,
 THOMAS C. CONNOLLY.